(12) United States Patent
Banister et al.

(10) Patent No.: US 10,838,983 B2
(45) Date of Patent: Nov. 17, 2020

(54) METHOD OF INTEGRATING REMOTE DATABASES BY PARALLEL UPDATE REQUESTS OVER A COMMUNICATIONS NETWORK

(71) Applicants: Richard Banister, Vista, CA (US); William Dubberley, Pulaski, TN (US)

(72) Inventors: Richard Banister, Vista, CA (US); William Dubberley, Pulaski, TN (US)

( * ) Notice: Subject to any disclaimer, the term of this patent is extended or adjusted under 35 U.S.C. 154(b) by 314 days.

(21) Appl. No.: 14/604,748

(22) Filed: Jan. 25, 2015

(65) Prior Publication Data

US 2016/0217196 A1 Jul. 28, 2016

(51) Int. Cl.
*G06F 16/28* (2019.01)

(52) U.S. Cl.
CPC ................ *G06F 16/284* (2019.01)

(58) Field of Classification Search
CPC .. G06F 17/30581; G06F 16/27; G06F 16/178; G06F 16/2322; G06F 16/10; G06F 16/23
See application file for complete search history.

(56) References Cited

U.S. PATENT DOCUMENTS

| | | | |
|---|---|---|---|
| 5,806,067 A | 9/1998 | Connor | |
| 6,208,990 B1 | 3/2001 | Suresh et al. | |
| 6,850,947 B1 | 2/2005 | Chung et al. | |
| 7,330,997 B1 | 2/2008 | Odom | |
| 71,330,997 | 2/2008 | Odom | |
| 7,822,717 B2 | 10/2010 | Kapoor | |
| 7,831,787 B1 | 11/2010 | Yueh | |
| 7,941,408 B2 | 5/2011 | Sinha | |
| 8,375,010 B2* | 2/2013 | Banister | G06F 17/30563 707/694 |
| 8,442,951 B1 | 5/2013 | Brannon | |
| 8,666,944 B2 | 3/2014 | Beatty | |
| 9,286,166 B2 | 3/2016 | Paterson | |
| 10,025,673 B1* | 7/2018 | Maccanti | G06F 11/1466 |
| 2002/0078218 A1 | 6/2002 | Feig | |
| 2002/0161784 A1 | 10/2002 | Tarenskeen | |

(Continued)

*Primary Examiner* — Etienne P Leroux
*Assistant Examiner* — Cindy Nguyen
(74) *Attorney, Agent, or Firm* — Patrick Reilly

(57) ABSTRACT

A system and method enable the selection of a time range, or other record selection criteria, of database records for upload from a local database source and for transfer to a remote database. A specifically bounded time period is selected to limit the number of data records selected for upload in a particular action to those records that are individually associated with date time stamp values falling within the specified time period. This limitation of records selected for inclusion in an upload process to data records having associations with date time stamps falling within a limited time range, or other criteria, reduces a likelihood of overload in transferring data and thereby reduces the incidence of time-outs in the communication of a local database, any intermediary server or software action, and the remote database in an updating of the recipient database to reflect a current state of the local database. A plurality of asynchronous threads may be employed to contemporaneously upload records associated with date time stamps having values within a requested time range whereby data records may be uploaded in parallel.

24 Claims, 18 Drawing Sheets

(56) References Cited

U.S. PATENT DOCUMENTS

| | | |
|---|---|---|
| 2003/0120625 A1 | 6/2003 | Jackson |
| 2004/0078228 A1 | 4/2004 | Fitzgerald |
| 2004/0236796 A1 | 11/2004 | Bhat |
| 2005/0055518 A1 | 3/2005 | Hochberg |
| 2005/0120062 A1 | 6/2005 | Sinha |
| 2006/0179155 A1 | 8/2006 | Bunting |
| 2007/0028056 A1 | 2/2007 | Harris |
| 2007/0106845 A1 | 5/2007 | Chu |
| 2007/0136381 A1 | 6/2007 | Maxwell |
| 2007/0185937 A1 | 8/2007 | Prahlad |
| 2008/0263007 A1 | 10/2008 | Schmidt |
| 2009/0077075 A1* | 3/2009 | Bent ................ G06F 17/30566 |
| 2009/0249005 A1 | 10/2009 | Bender |
| 2010/0082553 A1 | 4/2010 | Beatty |
| 2010/0318495 A1 | 12/2010 | Yan |
| 2011/0167148 A1 | 7/2011 | Bodziony et al. |
| 2012/0124081 A1 | 5/2012 | Ebrahimi |
| 2012/0124083 A1 | 5/2012 | Ebrahim |
| 2012/0221522 A1 | 8/2012 | Allman et al. |
| 2012/0254137 A1* | 10/2012 | Rozenwald ....... G06F 17/30445 707/700 |
| 2012/0323924 A1* | 12/2012 | Okun ................ G06F 17/30584 707/741 |
| 2013/0191523 A1 | 7/2013 | Yan |
| 2013/0238552 A1 | 9/2013 | Salb |
| 2013/0311441 A1* | 11/2013 | Erdogan ........... G06F 17/30578 707/713 |
| 2014/0036768 A1* | 2/2014 | Gao ...................... H04W 48/16 370/328 |
| 2014/0074790 A1 | 3/2014 | Berman |
| 2014/0229506 A1 | 8/2014 | Lee |
| 2015/0066865 A1 | 3/2015 | Yara |
| 2015/0142751 A1 | 5/2015 | Bruce |
| 2015/0205850 A1 | 7/2015 | Lu |
| 2016/0294943 A1 | 10/2016 | Banister |
| 2017/0185937 A1 | 6/2017 | Ricordeau et al. |

* cited by examiner

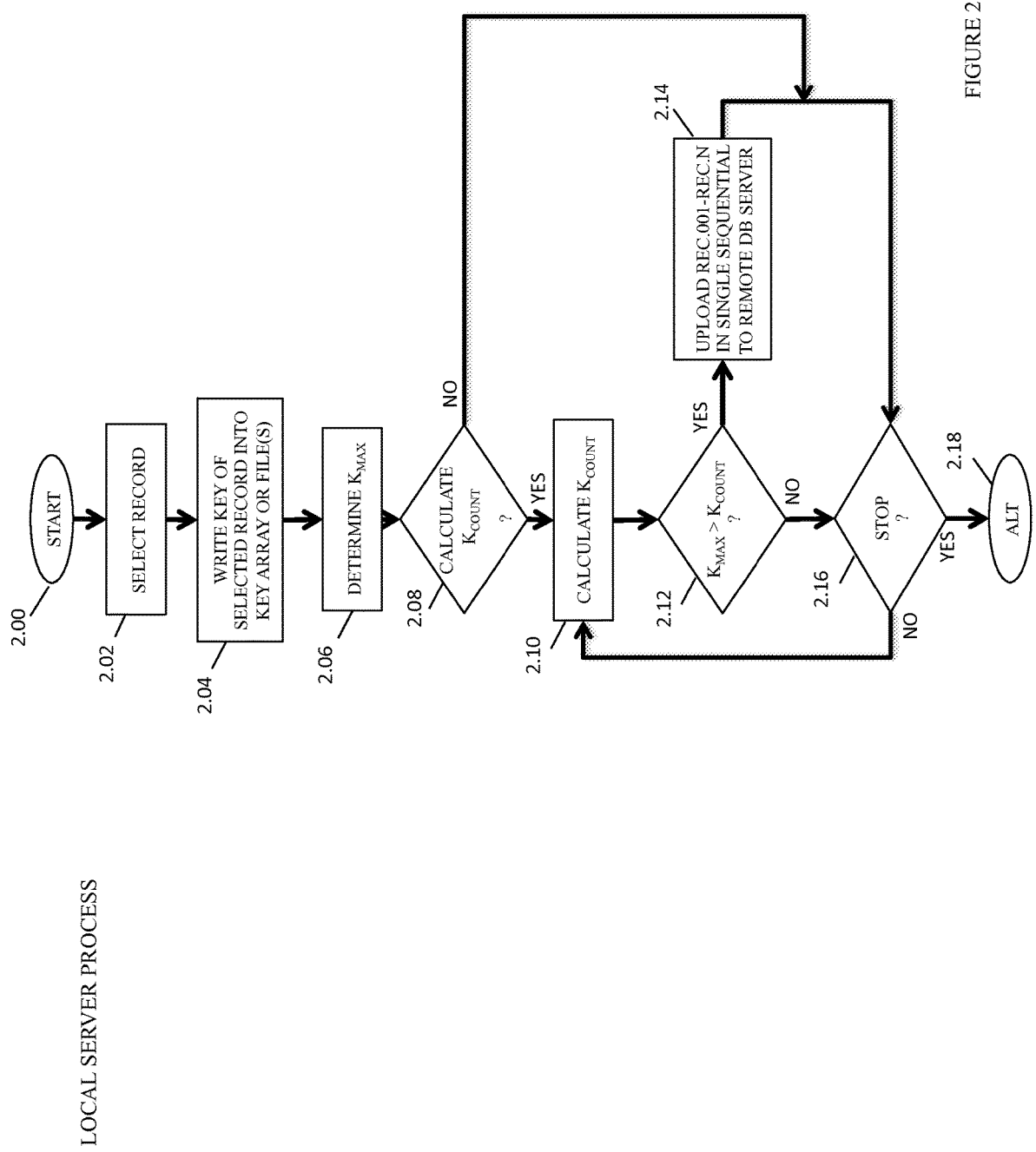

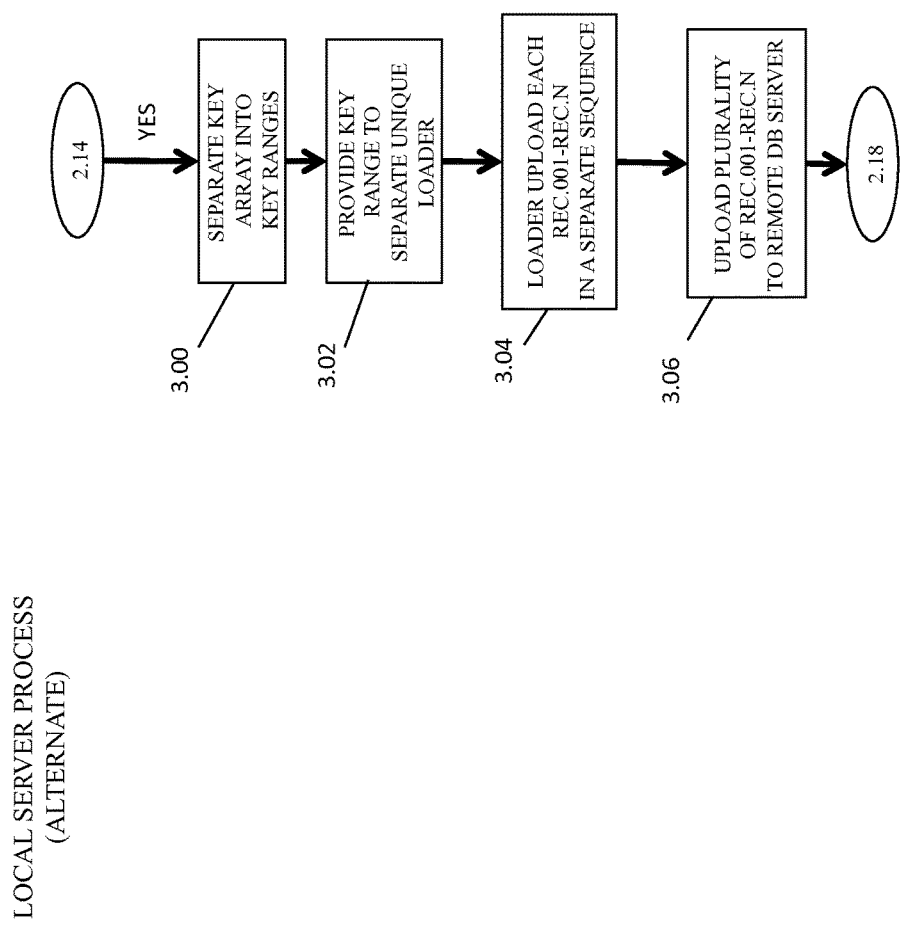

| REC.ID.001 | DTS.001 | REC.DATA.001 |

| REC.ID.002 | DTS.002 | REC.DATA.002 |

| REC.ID.N | DTS.N | REC.DATA.N |

| ULOAD.ID.001 | RDB.ADDR | LDB.ADDR | REC.001 |
|---|---|---|---|
| REC.002 | REC.003 | REC.004 | REC.N |

ULOAD.001

| TLOAD.ID.001 | RDB.ADDR | LDB.ADDR | REC.001 |
|---|---|---|---|
| REC.004 | REC.003 | REC.004 | REC.N |

TLOAD.001

METHOD OF INTEGRATING REMOTE DATABASES BY PARALLEL UPDATE REQUESTS OVER A COMMUNICATIONS NETWORK

FIELD OF THE INVENTION

The present invention relates to the relatedness of two or more databases that are coupled within an electronics communications network. More particularly, the invented method relates to revising records of a database by uploading data via an electronics communications network.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The prior art enables the updating of records of a database by uploading records associated with one or more identified records of the remote software database. The prior art fails to provide systems and methods that best enable the time-efficient transmission of updates of database records from a networked server to a storage server. There is therefore a long-felt need to provide a method and system that provide increased efficiencies of electronic transmission of updates to remote database records.

SUMMARY AND OBJECTS OF THE INVENTION

Towards these objects and other objects that will be made obvious in light of the present disclosure, a system and method are provided that enable the selection of database records for upload from a local database source and for transfer to a remote database on a criteria of each record selected for upload being associated with a date time stamp value being greater than the last replication time, or using a state indicator column in the database table. A plurality of asynchronous threads is employed to simultaneously upload those records in parallel.

An upload of all record updates is initiated, wherein all of these selected record updates are communicated from the local database to the remote database. If the number of update occurrences occurring exceeds a preconfigured value, the database is re-queried once the records retrieved exceed the limiting value, in order to free up database locks. The local database may thus be repeatedly directed to examine time periods or the state indicator values until the process is completed.

The upload process described herein is executed by a multi-threaded technique, wherein the record updates associated with the actually applied time period of a resultant upload process are substantively near-simultaneously uploaded to the remote database via the activity of a plurality of individual threads. This technique can involve multi-threaded subtasks or the spawning of separate operating system tasks.

According to an additional optional aspect of the invented method, the local database is directed by an external server to generate record update counts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which:

FIG. 2 is a flowchart of an aspect of invented method by which the local database server of FIG. 1 counts, divides and uploads a plurality of record updates in a key array or one or more files;

FIG. 3 is a flowchart of an optional process of the method of FIG. 2 wherein the local database server counts, divides, and uploads a plurality of record updates by means of one or more separate unique loaders;

DETAILED DESCRIPTION

Figure 1A:
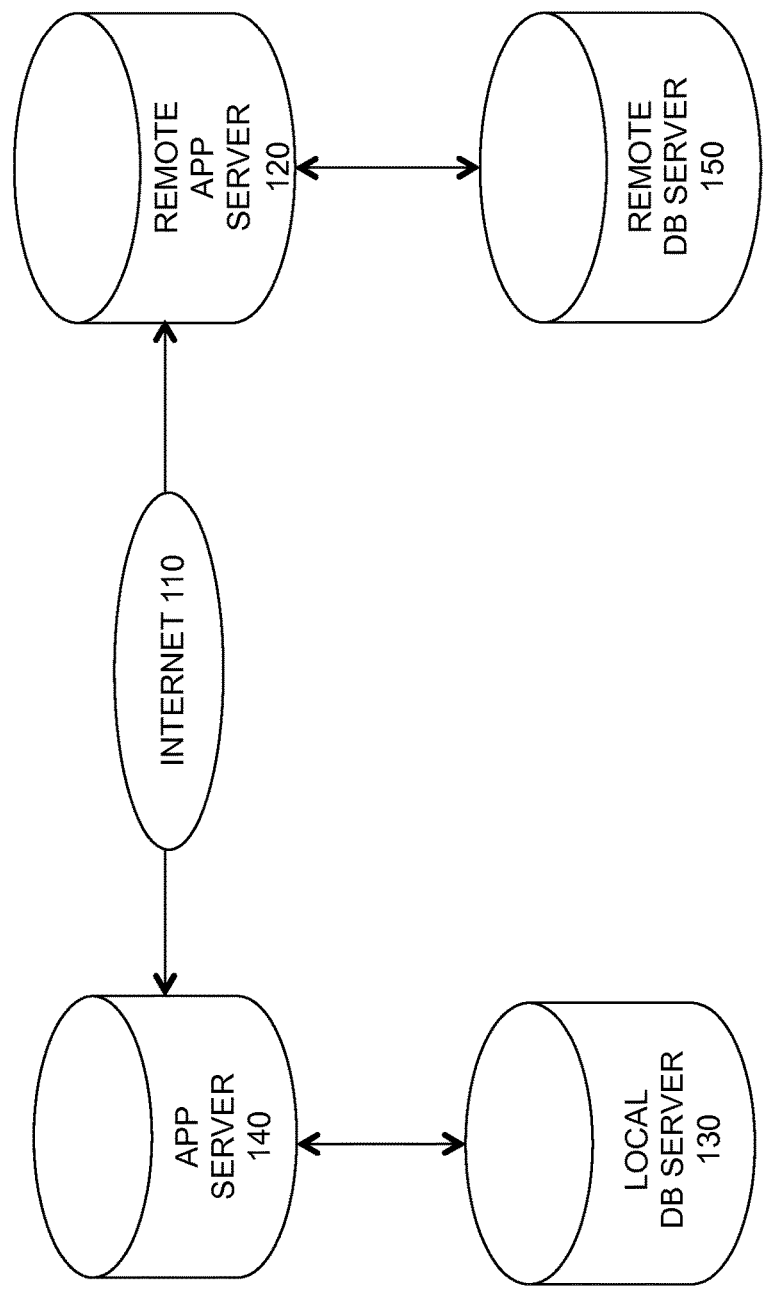
FIG. 1A is a diagram of an electronic communications network, comprising a remote application server, a local database server an application database server, the Internet and a remote database server.
Figure 1B:
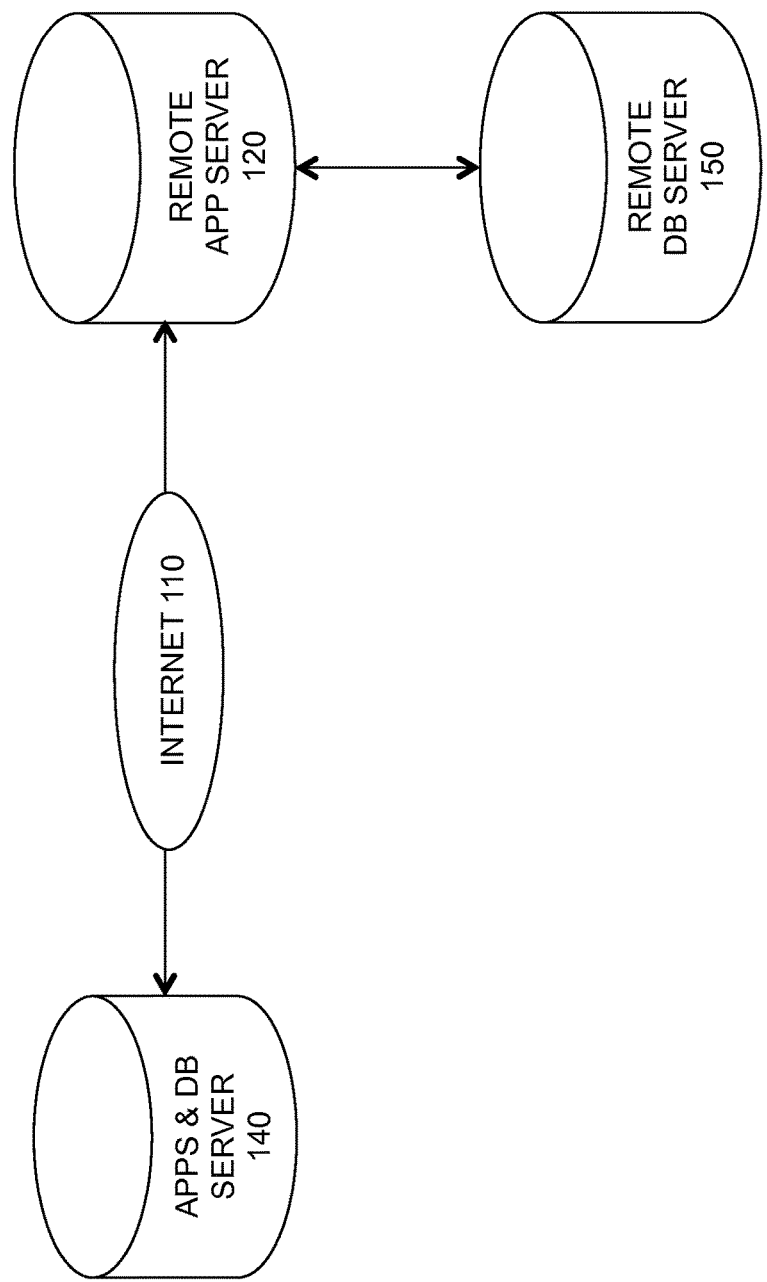
FIG. 1B is a diagram of an electronic communications network, comprising a remote application server, a remote database server, a local server that provides both database and application server functionality, and the Internet.

Referring now generally to the Figures and particularly to FIGS. 1A and 1B. FIG. 1A is a diagram of an electronic communications network 100. The electronic communications network 100 is comprised of an Internet 110, a remote application server 120, a local database server 130, an application server 140 and a remote database server 150. The remote application server 120 and the application server 140 are bi-directionally coupled within the electronic communications network 100 by the Internet 110. The local application server 140 is connected to the local database server 130 by a first local area network LAN.001. The remote application server 120 and the remote database server 150 are connected via a second local area network LAN.002.

An alternative configuration of the network 100 is provided in FIG. 1B, wherein the local application server 140 and the local database server 130 are combined on one computer.

In FIG. 1A, the application server DBMS 140, the local DBMS 130, the remote application DBMS 120, and/or the remote DBMS 150 may be or comprise an object oriented database management system ("OODBMS") and/or a relational database management system ("RDBMS"), and one or more databases DBS.1-DBS.N may be or comprise an object oriented database and/or a relational database. More particularly, the application server DBMS 140 the local DBMS 130, the remote application DBMS 120, or the remote server DBMS 150 may be or comprise one or more prior art database management systems including, but not limited to, an ORACLE DATABASE™ database management system marketed by Oracle Corporation, of Redwood City, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; and the POSTGRESQL™ open source object-relational database management system.

The remote application server 120 may bi-directionally communicate and transfer data with the local database server 120 via the network 100 by suitable electronic communications messaging protocols and methods known in the art including, but not limited to, Simple Object Access Protocol, Representational State Transfer, and/or a web service adapted to conform with the architecture and structure of the World Wide Web.

It is understood that the application database server 140, the local database server 130, the remote application server 120, and the remote database server 150 may be a software program hosted and/or enabled by, or may be or comprise a bundled computer software and hardware product such as, (a.) a network-communications enabled THINKPAD WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS SERVER™ or WINDOWS 8 ™ operating system marketed by Microsoft Corporation of Redmond, Wash.; (d.) a MACBOOK PRO™ personal computer as marketed by Apple, Inc. of Cupertino, Calif.; or (e.) other suitable computational system or electronic communications device known in the art capable of providing or enabling a web service known in the art.

Referring now generally to the Figures and particularly to FIG. 2, FIG. 2 is a flowchart of the invented method whereby the local database server 130 counts, divides, and uploads a plurality of record updates REC.001-REC.N in an key array KEY.ARR.001-KEY.ARR.N. The key array KEY.ARR.001-KEY.ARR.N may be or may comprise an ordered key array or an unordered key array. In certain preferred embodiments of the invented method, the key array KEY.ARR.001-KEY.ARR.N is preferably ordered in certain applications so as to (a.) minimize conflicts in uploading to a same record REC.001-REC.N from one or more processes; and/or (b.) minimizing or reducing instances of database block level deadlocks.

In step 2.02 the local database server 130 selects record updates for uploading to the remote application server 120. The criteria by which the local database server 130 selects the records for update are detailed in steps 6.00-6.10 of the method of FIG. 6. In step 2.04 the local database server 130 writes the record keys KEY.001-KEY.N of the selected record updates REC.001-REC.N into the key array KEY.ARR.001-KEY.ARR.N. In step 2.06, the local database server 130 determines a $K_{MAX}$, the maximum number of possible record keys which can be contemporaneously uploaded to the remote application server 120. The maximum number of record keys $K_{mAx}$ is a pre-determined number based upon the software and hardware restrictions of the remote application server 120, local database server 130, optionally the application database server 140, and the capability of the network 100.

The local database server 130 in step 2.08 determines whether to calculate the $K_{COUNT}$, i.e. the total number of record keys for an upload process in the key array KEY.ARR.001-KEY.ARR.N. When the determination in step 2.08 is negative, the local database server 130 advances to step 2.16, wherein the local database server 130 determines whether to terminate the process. Alternatively, when the determination in step 2.08 is positive, the local database server 130 calculates the $K_{COUNT}$ in step 2.10. The local database server 130 then proceeds to step 2.12. In step 2.12 the local database server 130 determines whether the maximum possible number of keys, $K_{MAX}$ is greater than the total number of keys $K_{COUNT}$.

When the determination in step 2.12 is positive, i.e. when the local database server determines that the $K_{MAX}$ is greater than the $K_{COUNT}$, the local server 130 uploads the record updates REC.001-REC.N associated with the keys KEY.001-KEY.N identified in step 2.04 in a single sequential order to the remote application server 120 in step 2.14. When the local database server 130 has executed step 2.14, or alternately when the determination in step 2.12 is negative and the $K_{MAX}$ is not greater than the $K_{COUNT}$, the local database server 130 proceeds to step 2.16. In step 2.16 the local database server 130 determines whether to terminate the current process. When the local database server 130 determines not to terminate the current process, the local database server 130 proceeds back to step 2.10, wherein the local database server 130 executes the loop of steps 2.10-2.16. When the local database server 130 determines in step 2.16 to terminate the process, the local database server 130 proceeds to step 2.18 and executes alternate processes.

Referring now generally to the Figures and particularly to FIG. 3, FIG. 3 is a flowchart describing an optional alternate process of the method of FIG. 2. In executing the method of FIG. 3, the local database server 130 proceeds from a positive determination in step 2.14 of FIG. 2 to step 3.00. In step 3.00 the local database server 130 separates a key array KEY.ARR.001-KEY.ARR.N into a plurality of key ranges K.RANGE.001-K.RANGE.N. The number of key ranges K.RANGE.001-K.RANGE.N into which the local database server 130 separates the key array KEY.ARR.001-KEY.ARR.N may optionally be less than the whole number two, equal to the whole number two, or greater than the whole number two. In step 3.02, the local server 130 provides each of the key ranges K.RANGE.001-K.RANGE.N to separate unique loaders LOAD.001-LOAD.N. In step 3.04, the local database server 130 directs the unique loader LOAD.001-LOAD.N to upload each of a plurality of software records REC.001-REC.N to which the keys KEY.001-KEY.N are assigned to the remote application server 120 in a separate sequence. In step 3.06, the local database server 130 uploads the plurality of records REC.001-REC.N associated with the keys KEY.001-KEY.N identified in step 2.04 of the method of FIG. 2 to the remote application server 120. The local database server 130 then proceeds to step 2.18 of the method of FIG. 2.

Figure 4:
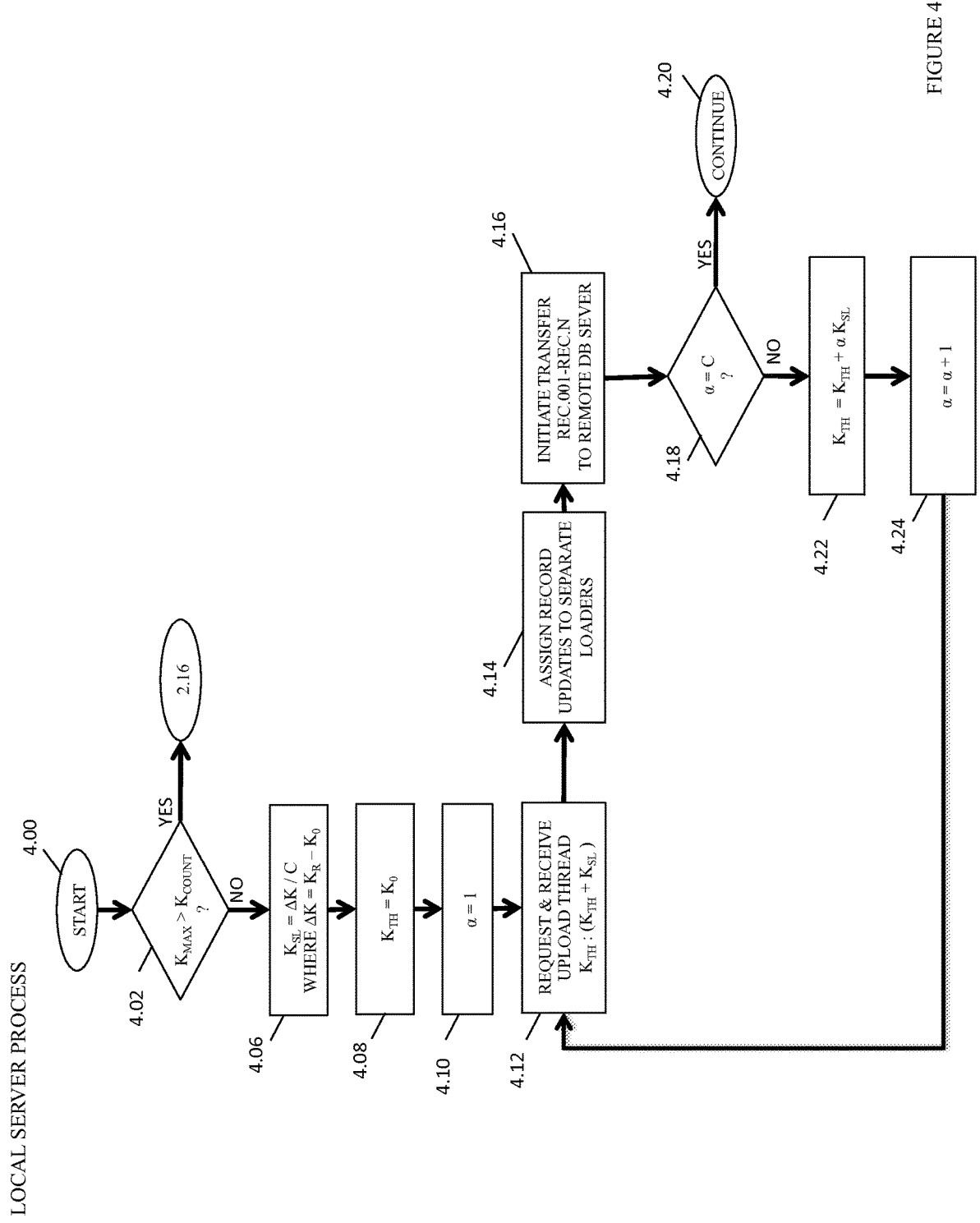
FIG. 4 is a flowchart of a further aspect of the invented method whereby the local database server separates record updates into separate individual threads to facilitate uploading.

Referring now generally to the Figures and particularly to FIG. 4, FIG. 4 is a flowchart of a yet further aspect of the present invention whereby the record updates REC.001-REC.N associated with the keys KEY.001-KEY.N are optionally uploaded through one of a plurality of upload threads for the purpose of expediting their upload from the local database server 130 to the remote application server 120. In step 4.02 the local database server determines whether $K_{max}$, the maximum possible number of record keys KEY.001-KEY.N, is greater than the $K_{count}$, i.e. the number of record keys in the ordered array KEY.ARR.001-KEY.ARR.001. When the local database server 130 in step 4.02 determines that the $K_{max}$ is greater than the $K_{count}$, the local database server 130 proceeds to step 2.16 of the method of FIG. 2.

In step 4.06 the local database server 130 initiates and defines a slice of record key values $K_{SL}$ which is equal to a $\Delta K$ divided by C, where C is a constant representing a specified number of authorized threads, and where $\Delta K$ is the difference between a $K_R$, representing the beginning of a bounded number of record updates that may be associated with a date time a previous date time stamp DTS.001-DTS.N representing the last time an update was transmitted from the local database server 130 to the remote application server 120, and a $K_O$ describing the end of a bounded number of record updates, wherein $K_O$ may be in at least some instances associated with a date time stamp DTS.001-DTS.N representing a current time. In step 4.08 the local database server 130 creates a record key variable value $K_{TH}$ and sets it as a new initial key value $K_O$, where $K_{TH}$ represents a per-thread record key value. The local database server 130 in step 4.10 sets a thread counter α to one. In step 4.12 the local database server 130 initiates and receives an upload thread that transfers software records REC.001-REC.N associated with the record keys KEY.001-KEY.N within the record key variable value $K_{TH}$ and the sum of $K_{TH}$ and $K_{SL}$. In step 4.14 the local database server 130 assigns the software records REC.001-REC.N associated with the record keys KEY.001-KEY.N to separate unique loaders LOAD.001-LOAD.N. In step 4.16 the local database server 130 initiates the transfer of the software records REC.001-REC.N associated with the record keys KEY.001-KEY.N to the remote application server 120.

In step 4.18 the local database server 130 determines whether the value of the thread counter α is equal to the value of the C. When the local database server determines in step 4.18 that the value of the thread counter α is equal to the value of the C, the local database server 130 continues to alternate processes in step 4.20. In the alternative, when the determination in step 4.18 is negative, and the value of the thread counter α is not equal to the value of the C, the local database server 130 proceeds to step 4.22. In step 4.22 the local database server 130 creates a new per-thread key value $K_{TH}$, consisting of the sum of the initial $K_{TH}$ plus the product of the value of the thread counter α and the record key value slice $T_{SL}$. In step 4.24 the thread counter α is incremented by the local database server 130 to be equal to a plus one. The local database server 130 then proceeds back to step 4.12 and repeats steps 4.12-4.24 until all software records REC.001-REC.N associated with the keys KEY.001-KEY.N contained within $K_{count}$ are assigned to a specified thread.

Figure 5:
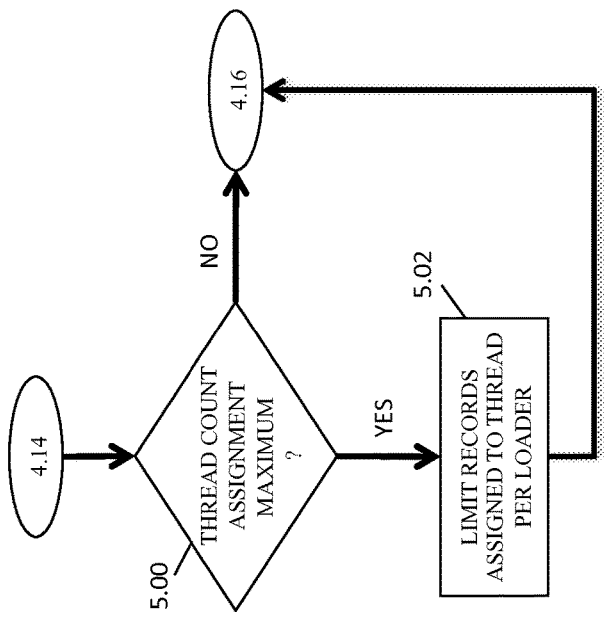
FIG. 5 is a flowchart of an alternate method to the process of FIG. 4, whereby the number of threads assigned to a loader is limited by a maximum thread count assignment.

Referring now generally to the Figures and particularly to FIG. 5, FIG. 5 is a flowchart of an addition to the method of FIG. 4. The local database server 130 proceeds from step 4.14 of FIG. 4 to step 5.00. In step 5.00 the local database server 130 determines whether a maximum numbers of software records REC.001-REC.N associated with the key values KEY.001-KEY.N has been assigned to each thread. When the determination in step 5.00 is positive, the local database server limits the number of software records REC.001-REC.N assigned to each thread. Alternatively when the determination in step 5.00 is negative, or when the local database server 130 has completed the execution of step 5.02 the local database server 130 proceeds to step 4.16 of FIG. 4.

Figure 6:
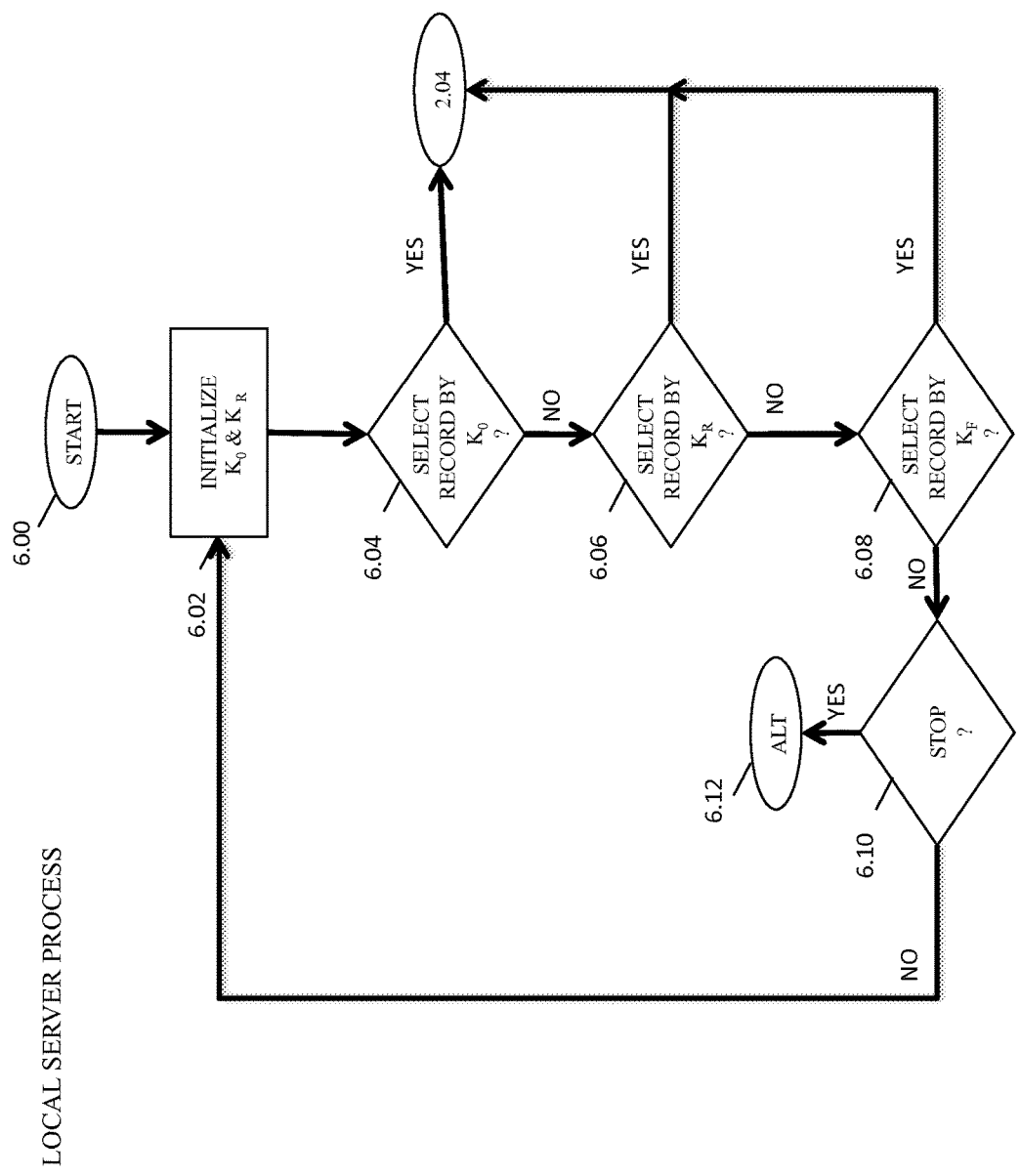
FIG. 6 is a flowchart of a yet further aspect of the invented method relating to the criteria by which a record is selected for update.

Referring now generally to the Figures and particularly to FIG. 6, FIG. 6 is a flowchart of an aspect of the invented method relating to the criteria by which the local database server 130 selects software record updates. In step 6.02 the local database server initializes the $K_R$, representing the beginning of a bounded number of record updates, often including the date time stamp DTS.002 representing the last time an update was transmitted from the local database server 130 to the remote application server 120, and the $K_O$ describing the end of a bounded number of record updates, often including the date time stamp DTS.001 representing the current time. In step 6.04 the local database server 130 determines whether the software records REC.001-REC.N will be selected for update by the $K_O$. When the determination in step 6.04 is negative, the local database server 130 determines in step 6.06 whether the local database server 130 will select the software records REC.001-REC.N for update by the $K_R$. When the determination in step 6.06 is negative, the local database server 130 determines in step 6.08 whether the software records REC.001-REC.N will be selected for update by the $K_F$, $K_F$ being the key associated with a date time stamp DTS.003, representing the time of formation of the software records REC.001-REC.N. When the determination in step 6.08 is negative, the local database server 130 proceeds to step 6.10, wherein the local database server 130 determines whether to terminate the process. When the determination in step 6.10 is negative, the local database server 130 returns to step 6.02 and re-executes steps 6.02 through 6.10 as necessary. Alternatively, when the determination in step 6.10 is positive, the local server 130 executes alternate processes in step 6.12. In the alternative, when the determination either in step 6.04, or in step 6.06, or in step 6.08 is positive, the local database server proceeds to step 2.04 of the method of FIG. 2.

Figure 7:
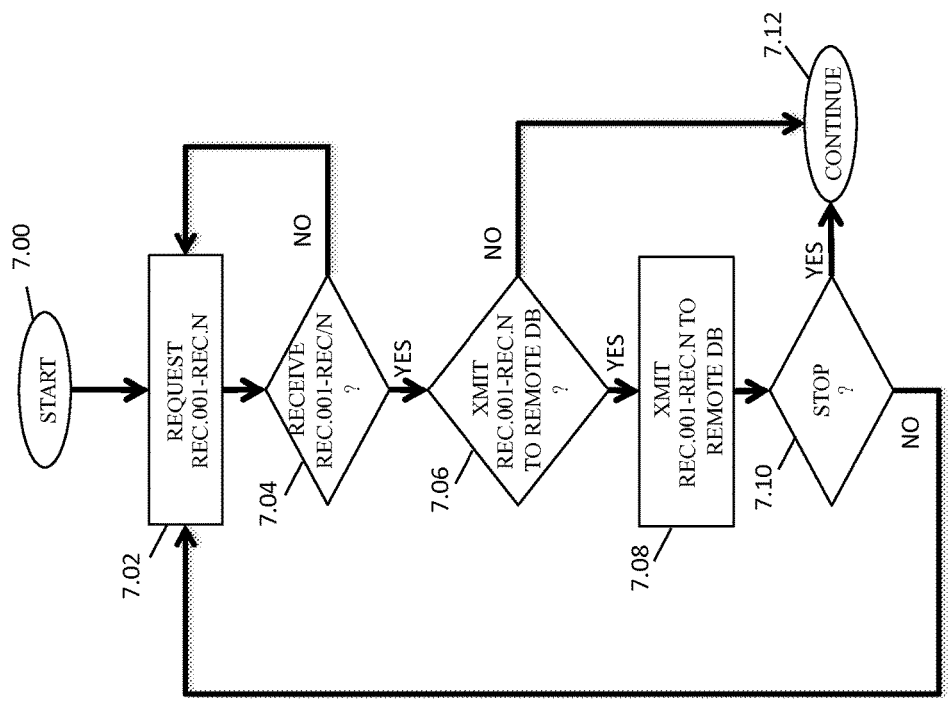
FIG. 7 is a flowchart of a further aspect of the invented method whereby the remote application server receives record updates.

Referring now generally to the Figures and particularly to FIG. 7, FIG. 7 is a flowchart of a process performed by the remote application server 120, whereby the remote application server 120 requests and receives software records REC.001-REC.N from the local database server 130, and subsequently transmits the received records to the remote database server 150. In step 7.02 the remote application server 120 requests the software records REC.001-REC.N from the local database server 130. In step 7.04 the remote application server 120 determines whether the software records REC.001-REC.N have been received from the local database server 130. When the remote application server 120 determines that the software records REC.001-REC.N have not been received, the remote application server 120 returns to step 7.02 and re-requests the software records REC.001-REC.N. Alternatively, when the determination in step 7.04 is positive, and the remote application server 120 determines that the software records REC.001-REC.N have been received, the remote application server 120 advances to step 7.06. In step 7.06 the remote application server 120 determines whether to transmit the software records REC.001-REC.N to the remote database server 150. When the determination in step 7.06 is negative, the remote application server 120 proceeds to step 7.12, wherein the remote application server 120 continues to alternate processes. Alternatively, when the determination in step 7.06 is positive, the remote application server 120 proceeds to step 7.08, wherein the remote application server 120 transmits the software records REC.001-REC.N to the remote database server 150. In step 7.10 the remote application server 120 determines whether to terminate the process. When the remote application server 120 determines to terminate the process in step 7.10, the remote application server 120 continues to alternate processes in step 7.12. In the alternative, when the remote application server 120 determines in step 7.10 not to terminate the process, the remote application server 120 returns to step 7.02 and re-executes the loop of steps 7.02 through 7.10 as necessary.

Figure 8:
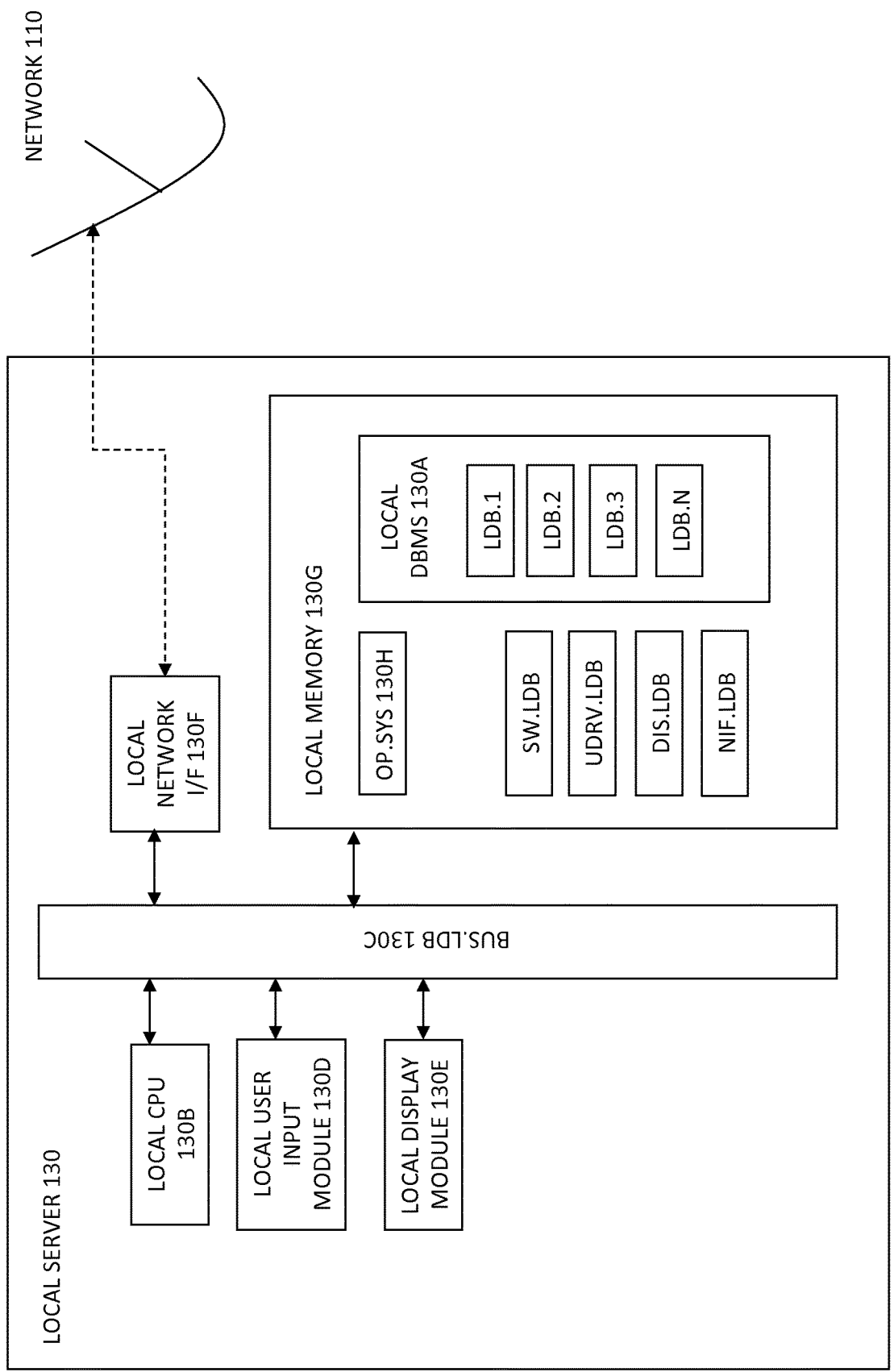
FIG. 8 is a block diagram of the local database server of FIG. 1.

Referring now generally to the Figures and particularly to FIG. 8, FIG. 8 is a block diagram of the local database server 130 of FIG. 1. A local database server operating system software OP.SYS 130H of the local database server 130 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; W™ VISTA™ WINDOWS 7, or WINDOWS 8 ™ operating system as marketed by Microsoft Corporation of Redmond, Wash.; or the MAC OS X operating system or iPhone 6 OS™ as marketed by Apple, Inc. of Cupertino, Calif.

The local database server 130 further comprises a software bus BUS.LDB 130C. The software bus BUS.LDB 130C connects, and facilitates communication between, a local CPU 130B, a local input module 130D, a local display module 130E, a local network I/F 130F which allows the local database server 130 to connect to the network 110. The local database server 130 also includes a local database memory 130G The local database memory 130G comprises a local database operating system OP.SYS 130H, a local database software SW.LDB, a local database user input module driver UDRV.LDB, a local display driver DIS.LDB, and a local database network interface driver NIF.LDB. The local database system memory 130G further comprises a local database management system DBMS 130A.

Figure 9A:
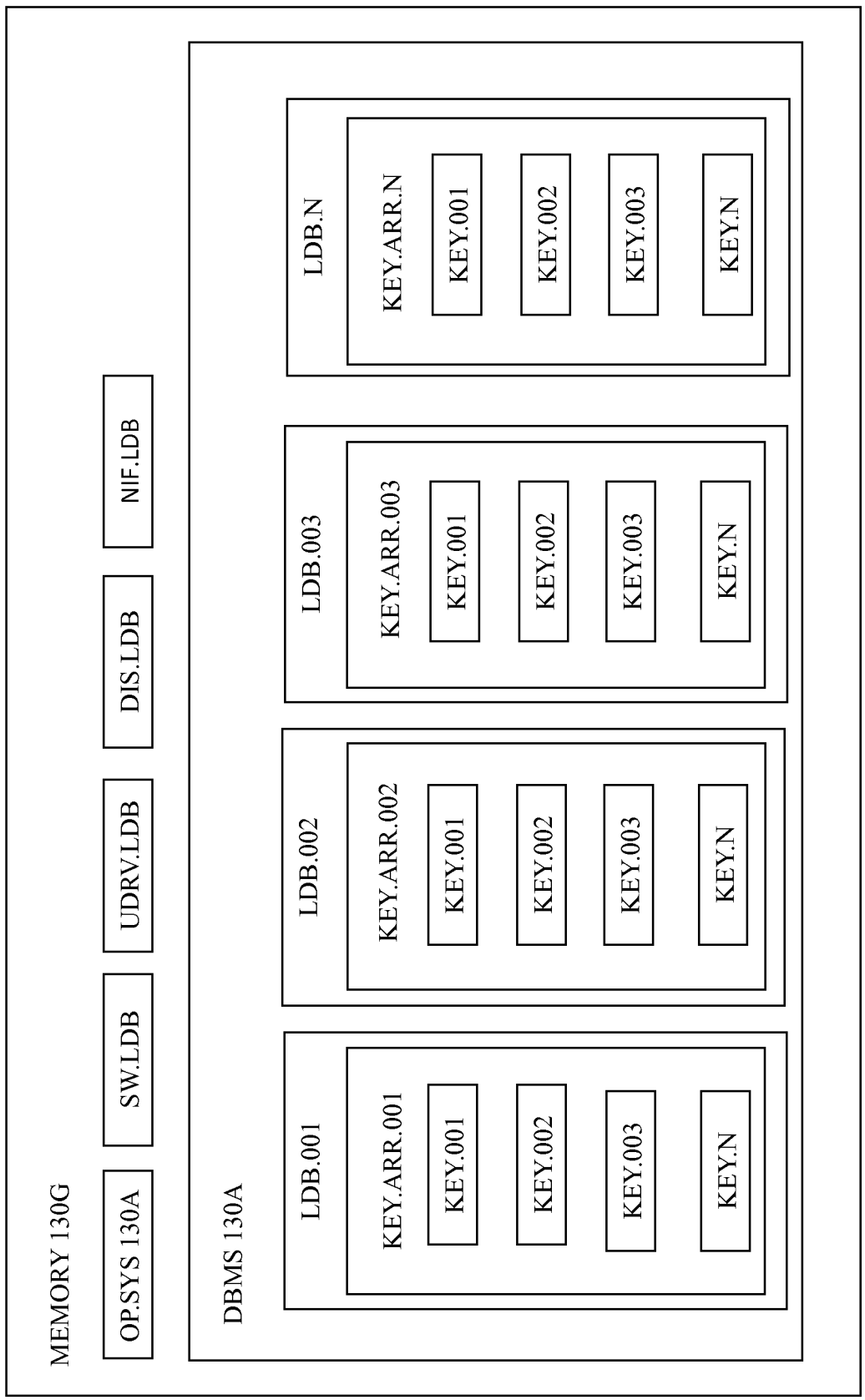
FIG. 9A is a block diagram of the memory stored within the local database server of FIG. 7.

Referring now generally to the Figures and particularly to FIG. 9A, FIG. 9A is a block diagram of the local database system memory 130G of FIG. 8. The local database system memory 130G includes the local database operating system OP.SYS 130A, the local database software SW.LDB, the user input module driver UDRV.LDB, the local database display driver DIS.LDB, and the local database network interface driver NIF.LDB. The local database system memory 130G further includes a local database management system DBMS 130A. The local database management system is comprised of exemplary local databases LDB.001, LDB.002, LDB.003 and LDB.N. The local databases LDB.001-LDB.N contain a plurality of exemplary ordered keys arrays, respectively KEY.ARR.001, KEY.ARR.002, KEY.ARR.003 and KEY.ARR.N. Each of the key arrays KEY.ARR.001-KEY.ARR.N contain exemplary record keys KEY.001, KEY.002, KEY.003, and KEY.N. Each of these record keys KEY.001-KEY.N may be shared with the remote application server 120 and/or the application database server 140 by means of the electronic communications network 100.

Figure 9B:
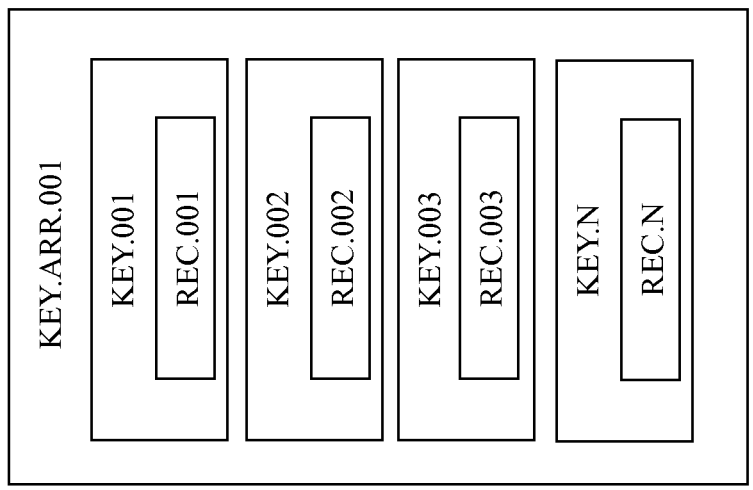
FIG. 9B is a block diagram of the key array of FIG. 9A.

Referring now generally to the Figures and particularly to FIG. 9B, FIG. 9B is a block diagram of the exemplary first key array KEY.ARR.001 of FIG. 9A. The first key array KEY.ARR.001 comprises the first record key KEY.001, the second record key KEY.002, the third record key KEY.003, and the Nth record key KEY.N. Each of the exemplary record keys KEY.001-KEY.N point to software records REC.001, REC.002, REC.003, and REC.N, respectively, in order to allow the local database server 130 to identify which of the software records REC.001-REC.N to transmit to the remote application server 120, or optionally to the application database server 140 when an update request UREQ.001 is sent to the local database server 130.

Figure 10:
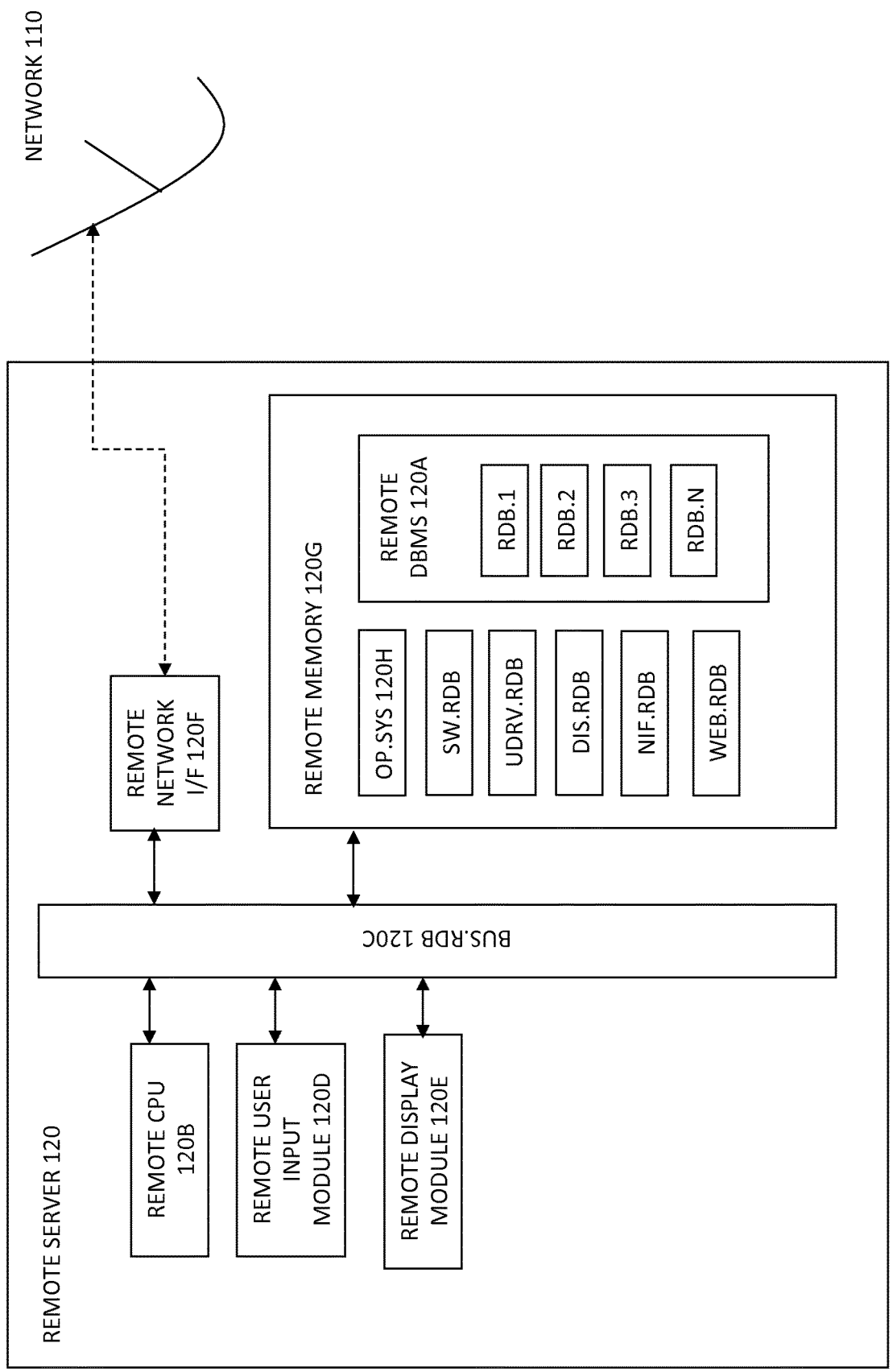
FIG. 10 is a block diagram of the remote application server of FIG. 1.

Referring now generally to the Figures and particularly to FIG. 10, FIG. 10 is a block diagram of the remote server 120 of FIG. 1. The remote application server 120 includes a remote database software bus BUS.RDB 120C. Bi-directionally communicatively coupled with the BUS.RDB 120C are a remote database central processing unit 120B, and remote database user input module 120D, and a remote database network I/F 120F, which allows the remote application server 120 to connect to the network 110. The remote application server further includes a remote database memory 120G. The remote database memory 120G includes a remote database operating system 120H. A remote application server operating system software OP.SYS 120H of the remote application server 120 may be selected from freely available, open source and/or commercially available operating system software, to include but not be limited to a LINUX™ or UNIX™ or derivative operating system, such as the DEBIAN™ operating system software as provided by Software in the Public Interest, Inc. of Indianapolis, Ind.; a WINDOWS VISTA™, WINDOWS 7 ™, or WINDOWS 8 ™ operating system as marketed by Microsoft Corporation of Redmond, Wash.; or the MAC OS X operating system or iPhone 6 OS™ as marketed by Apple, Inc. of Cupertino, Calif.

The remote database memory 120G further includes remote database software SW.RDB, a remote database display driver DIS.RDB, a remote database user input module driver UDRV.RDB, a remote database network interface NIF.RDB, and a webserver WEB.RDB. A yet further component of the remote database memory 120G is a remote database management system DBMS 120A.

Figure 11:
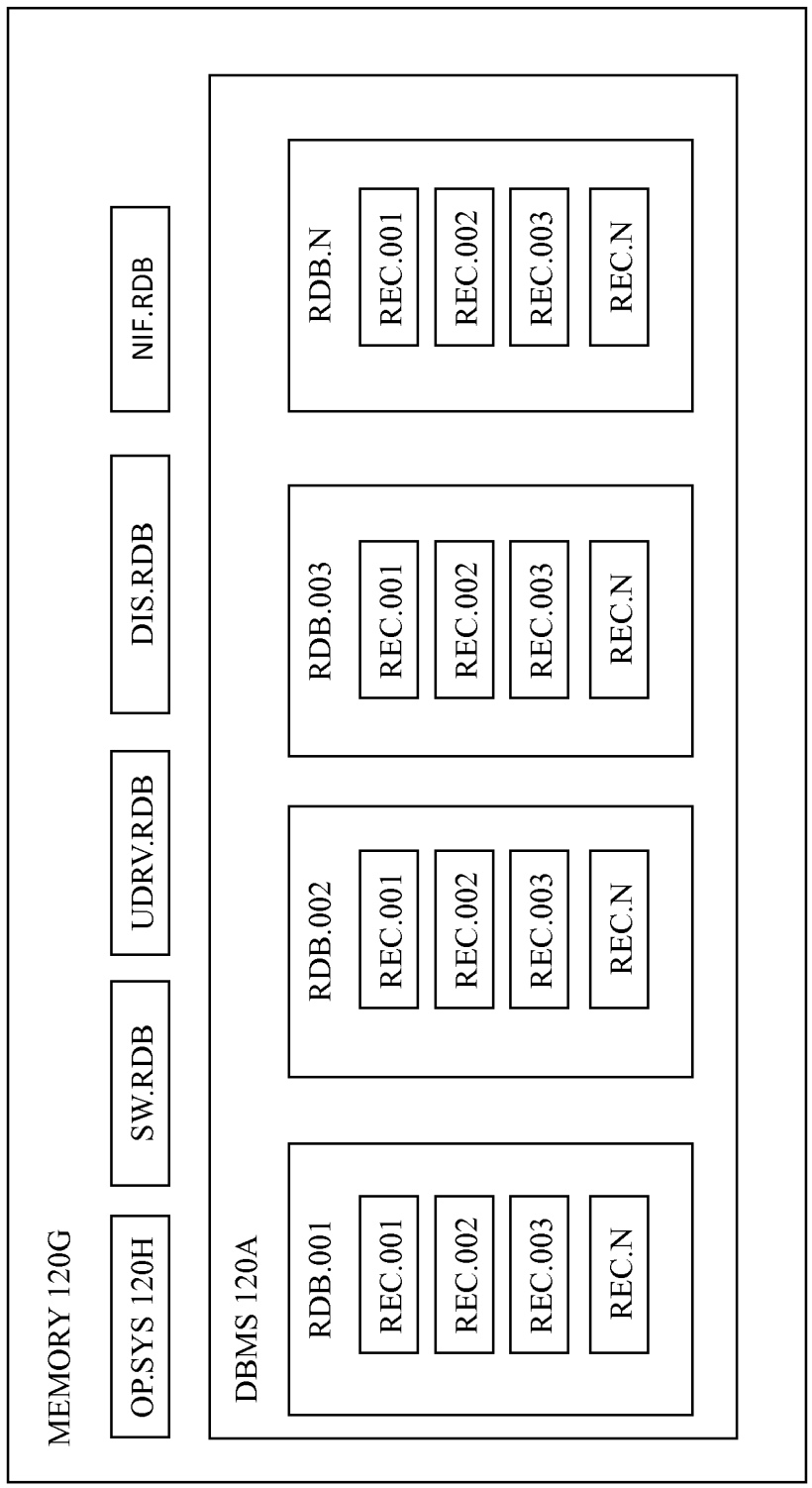
FIG. 11 is a block diagram of the memory stored within the remote application server of FIG. 10.

Referring now generally to the Figures and particularly to FIG. 11, FIG. 11 is a block diagram of the remote database system memory 120G of FIG. 10. The remote database system memory 120G includes the above-mentioned remote database operating system 120H, the remote database software SW.RDB, the remote database display driver, the remote database input module drive UDRV.RDB, and the remote database network interface NIF.RDB. Contained within the remote database management software 120G of the remote database system memory 120G are the remote database RDB.001, RDB.002, RDB.003, and RDB.N. Each remote database RDB.001-RDB.N contain database records REC.001, REC.002, REC.003, and REC.N. The database records REC.001-REC.N may be communicated with by the local server 130 by means of the electronic communications network 110.

Figure 12A:
FIG. 12A is a block diagram of an exemplary first software data record stored within the remote application server, the local database server and optionally the application database server of FIG. 1.
Figure 12B:
FIG. 12B is a block diagram of an exemplary second software data record stored within the remote application server, the local database server and optionally the application database server of FIG. 1.
Figure 12C:
FIG. 12C is a block diagram of an exemplary Nth software data record stored within the remote application server, the local database server, and optionally the application database server of FIG. 1.

Referring now generally to the Figures and particularly to FIGS. 12A-12C. FIG. 12A is a block diagram of an exemplary software data record REC.001 stored within the remote application server 120, the local database server 130, optionally the application database server 140, and/or optionally the remote database server 150 of FIG. 1. The software data record REC.001 comprises an exemplary first database record identification REC.ID.001, a first data set REC.DATA.001, and a first date time stamp DTS.001 by which the first database record REC.001 may be identified. FIG. 12B is a block diagram of an exemplary second database record REC.002. REC.002 includes a second database record identification REC.ID.002, a second data set REC.DATA.002, and a second date time stamp DTS.002 by which the second database record REC.002 may be identified. FIG. 12C is a block diagram of an exemplary Nth data record REC.N. REC.N includes an Nth record identification REC.ID.N, an Nth data set REC.DATA.N, and an Nth date time stamp by which REC.N may be identified. The database records REC.001-REC.N may be transmitted via the electronic communication network 100 to the remote application server 120, the local database server 130, optionally the application database server 140 and/or optionally the remote database server 150.

Figure 13A:
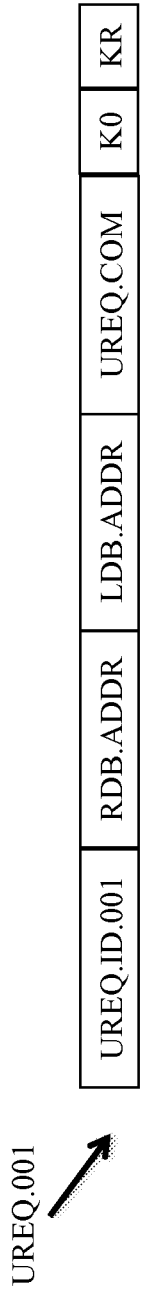
FIG. 13A is a block diagram of an exemplary first record request, transmitted by the remote application server.
Figure 13B:
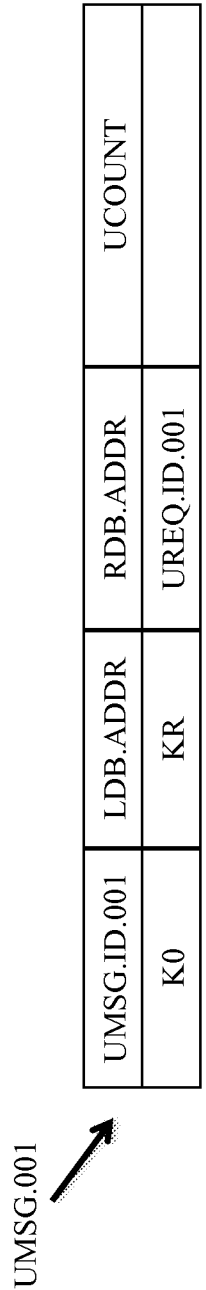
FIG. 13B is a block diagram of an exemplary first record update message, transmitted by the local database server.
Figure 13C:
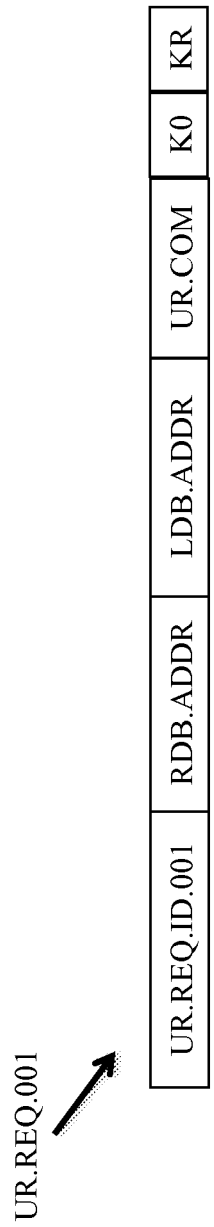
FIG. 13C is a block diagram of an exemplary record upload request.

Referring now generally to the Figures and particularly to FIGS. 13A-13C. FIG. 13A is a block diagram of an exemplary first record request UREQ.001, transmitted by the remote application server 120. Contained within the first record update request UREQ.001 are a first record update request identification UREQ.ID.001, a remote application server address RDB.ADDR as a destination address, an local database server address LDB.ADDR as the sender address, a request for the number of available record updates UREQ.COM, a $K_O$ describing the end of a bounded number of record updates, often including a date time stamp DTS.001 representing the current time, and a $K_R$, representing the beginning of a bounded number of record updates, often including a date time stamp DTS.002 representing the last time an update was transmitted from the local database server 130 to the remote application server 120.

FIG. 13B is a block diagram of an exemplary first record update message UMSG.001, transmitted by the local database server 130. UMSG.001 contains a first record update identification UMSG.ID.001, the local database server address LDB.ADDR as the sender address, the remote application server address RDB.ADDR as the destination address, a count of the number of available updates UCOUNT, the $K_O$ describing the end of a bounded number of record updates, often including a date time stamp DTS.001 representing the current time, and the $K_R$, representing the beginning of a bounded number of record updates, often including a date time stamp DTS.002 representing the last time an update was transmitted from the local database server 130 to the remote application server 120. The UMSG.001 further includes the update request identification UREQ.ID.001 of FIG. 13A.

FIG. 13C is a block diagram of an exemplary first record upload request UR.REQ.001. UR.REQ.001 contains a record upload request identification UR.REQ.ID.001, the remote application server address RDB.ADDR as the sending address, the local database server address LDB.ADDR as the recipient address, a data record upload request communication UR.COM, and the $K_O$ and the $K_R$ of FIGS. 13A-13B.

Figure 13D:
FIG. 13D is a block diagram of an exemplary first data record upload from the local database server to the remote application server of FIG. 1.
Figure 13E:
FIG. 13E is a block diagram of an exemplary first data record download transferral message providing a plurality of records from the local database server to the remote application server of FIG. 1.

Referring now generally to the Figures and particularly to FIGS. 13D-13E. FIG. 13D is a block diagram of an exemplary first data record upload message ULOAD.001 wherein the local database server 130 provides to the remote application server 120 a plurality of data records REC.001-REC.N stored within the local DBMS 130A of the local database server 130 that are associated with the key values KEY.001-KEY.N.

The first data record upload message ULOAD.001 comprises a unique first data record upload message identifier ULOAD.ID.001, the remote application server network address RDB.ADDR of the remote application server 120 as a destination address, the local database server network address LDB.ADDR of the local database server 130 as a sender address, and a plurality of software records REC.001-REC.N.

One or more data record upload messages ULOAD.001-ULOAD.N may be transmitted by the local database server 130 to the remote application server 120 in various aspects and optional aspects of the invented method, including, but not limited to, step 2.16 of the process of FIG. 2. One or more data record upload messages ULOAD.001-ULOAD.N may be received by the remote application server 120 in various aspects and optional aspects of the invented method, including, but not limited to the method of FIG. 7.

FIG. 13E is a block diagram of an exemplary first data record download transferal message TLOAD.001 wherein the local database server 130 provides to the remote application server 120 with a plurality of records.

The first data record download transferal message TLOAD.001 includes a unique first data record upload transferal message identifier TLOAD.ID.001, a remote application server network address RDB.ADDR of the remote application server 120 as a destination address, the local database server network address LDB.ADDR of the local database server 130 as a sender address, and a plurality of data records REC.001-REC.N.

Figure 14:
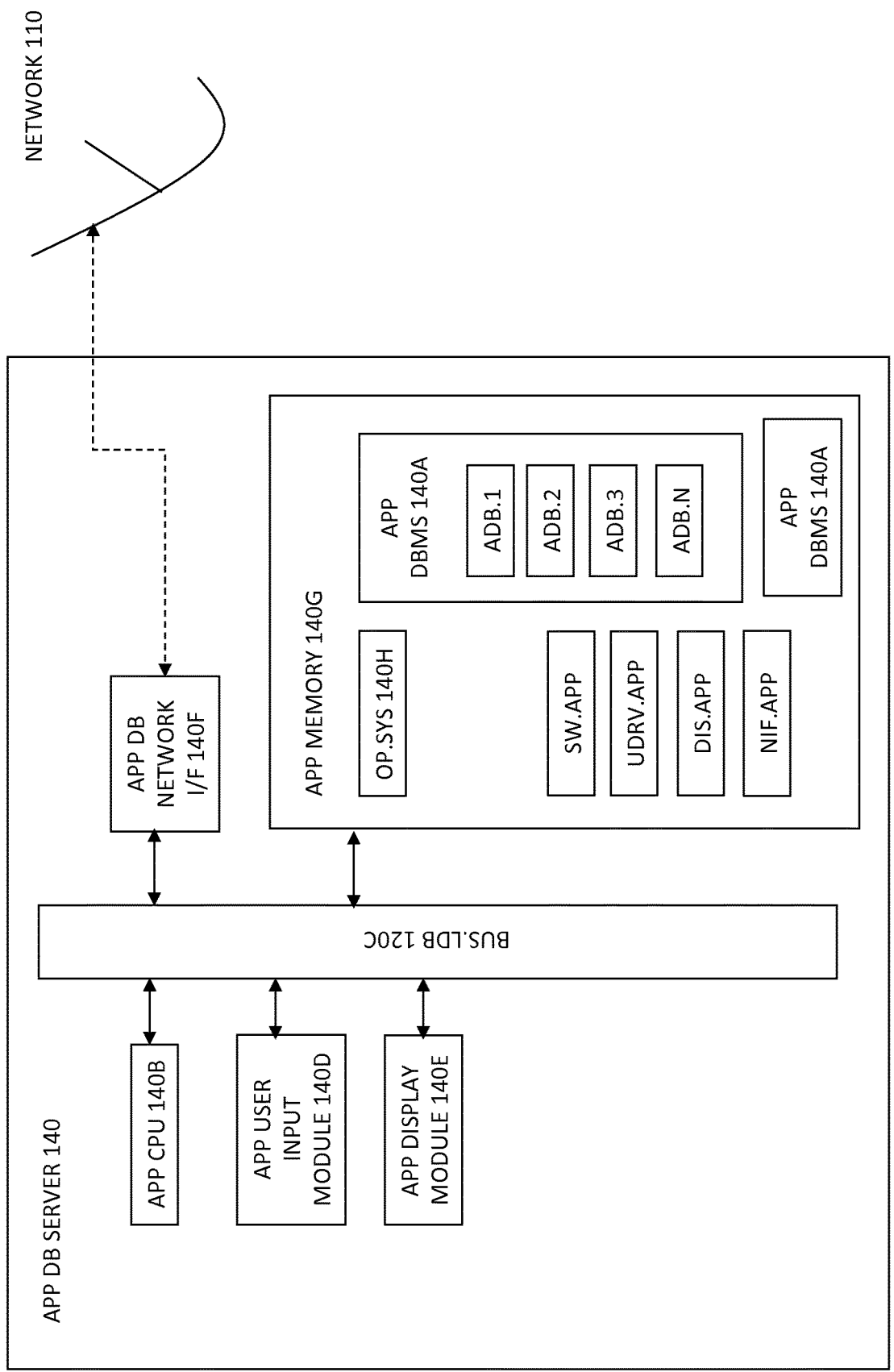
FIG. 14 is a block diagram of the application database server of FIG. 1.

Referring now generally to the Figures, and particularly to FIG. 14, FIG. 14 is a block diagram of the application database server 140 of FIG. 1. The application database server 140 includes a application database software bus BUS.RDB 140C. Bi-directionally communicatively coupled with the application database software bus BUS.RDB 140C are an application database central processing unit 140B, an application database user input module 140D, and an application database network I/F 140F, which allows the application database server 140 to connect to the network 110.

The application database server further includes a application database memory 140G. The application database memory 140G includes an application database operating system 120H. An application database server operating system software OP.SYS 140H of the application database server 140 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS VISTA™, WINDOWS 7 ™ or WINDOWS 8 ™ operating system as marketed by Microsoft Corporation of Redmond, Wash.; or the MAC OS X operating system or iPhone 6 OS™ as marketed by Apple, Inc. of Cupertino, Calif.

The application database memory 140G further includes an application database software SW.APP, a remote database display driver DIS.APP, an application database user input module driver UDRV.APP, an application database network interface NIF.APP, and an application webserver WEB.APP. A yet further component of the remote database memory 140G is a remote database management system DBMS 140A.

Figure 15:
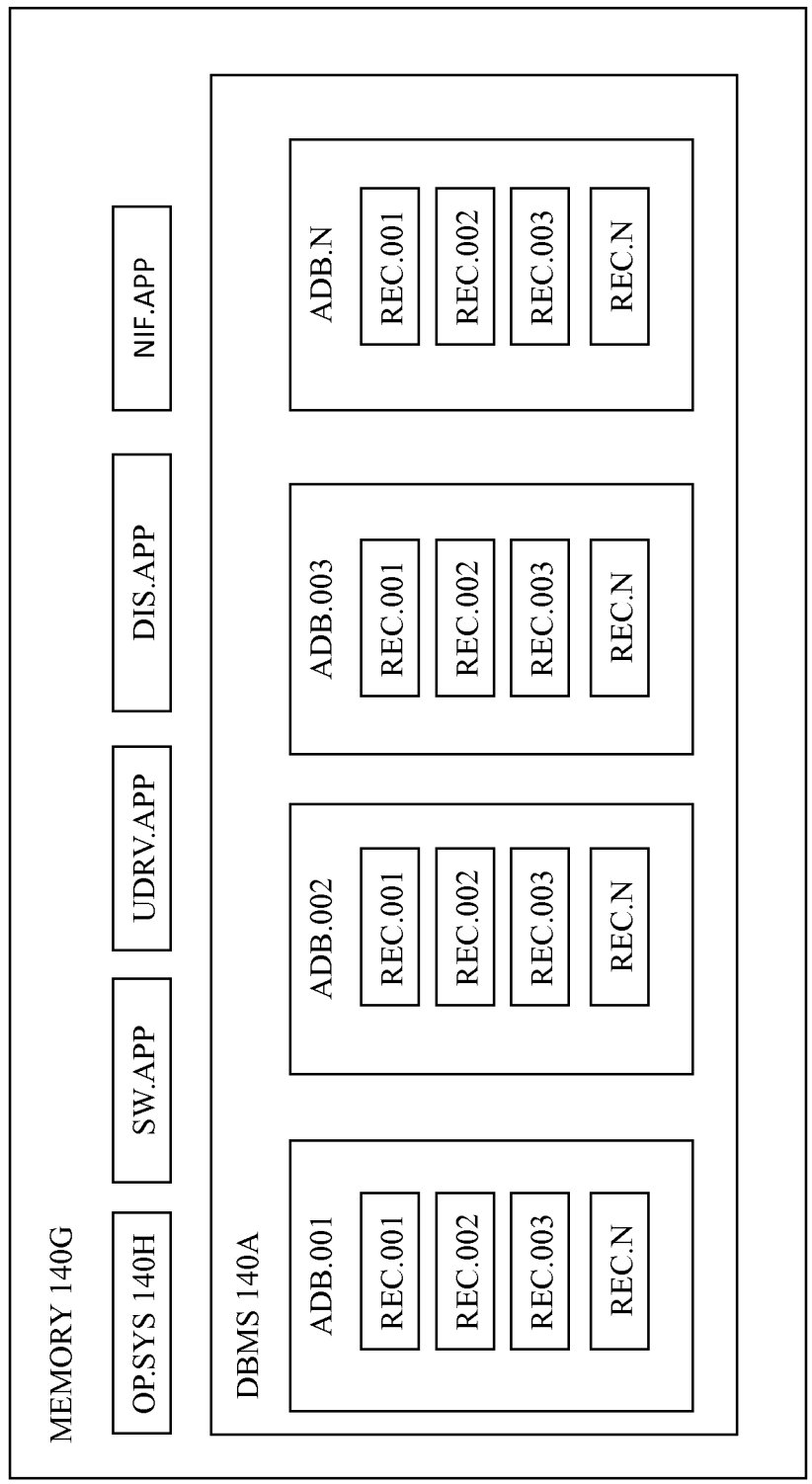
FIG. 15 is a block diagram of the memory stored within the application database server 140 of FIG. 14.

Referring now generally to the Figures and particularly to FIG. 15, FIG. 15 is a block diagram of the application database system memory 140G of FIG. 14. The application database system memory 140G includes the application database operating system 140A, the application database software SW.APP, the user input module driver UDRV.APP, the application database display driver DIS.APP, and the application database network interface driver NIF.APP. The application database system memory 140G further includes a application database management system DBMS 140A. The application database management system is comprised of application databases ADB.001. ADB.002. ADB.003, and ADB.N. Each application database ADB.001-ADB.N contains a plurality of software records REC.001, REC.002, REC.003, and REC.N. Each of these records REC.001-REC.N may be shared with the remote application server 120 and/or the local database server 130 by means of the electronic communications network 110.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

We claim:

1. A computer bi-directionally coupled with a remote server via an electronics communications network ("network"), the computer having a processor and a bi-directionally communicatively coupled memory, the memory storing a plurality of executable instructions that, when executed by the processor, facilitate performance of operations, comprising:
   a. A DBMS accessible to the processor selecting a plurality of records for upload to a second DBMS of the server accessible to the processor via the network;
   b. Writing a key of each selected record of the plurality of records into an ordered key array, and thereafter;
   c. Determining a maximum array key count $K_{max}$ value;
   d. Calculating the count of keys of the ordered array $K_{count}$ value;
   e. Determining if the $K_{max}$ value>$K_{count}$ value;
   f. If the $K_{max}$ value>$K_{count}$ value, uploading the selected records in a single sequential upload to the second DBMS;
   g. Determining that $K_{count}$ value>$K_{max}$ value;
   h. If the $K_{count}$ value>$K_{max}$ value, separating the key array into two or a plurality of key ranges;
   i. Providing a minimum key value & maximum key value of each key range to a separate loader;
   j. Tasking each loader to upload each record associated with a received key in a separate sequence; and
   k. Uploading the plurality of records to the second DBMS via the network.

2. The method of claim 1, wherein a key count of each key range is equal.

3. The method of claim 1, further comprising a plurality of loaders and providing each key individually to a unique loader.

4. The method of claim 3, wherein a key count of each key range provided to each loader are equal.

5. The method of claim 1, wherein the DBMS and the second DBMS are bi-directionally communicatively coupled by an electrical communications network.

6. The method of claim 1, wherein the electrical communications network comprises the Internet.

7. The method of claim 1, wherein the DBMS and the second DBMS are bi-directionally communicatively coupled by an electrical communications network.

8. The method of claim 7, wherein electrical communications network comprises of Internet.

9. The method of claim 1, wherein at least one key references a record update data.

10. The method of claim 1, wherein a plurality of keys each reference a unique record update data.

11. The method of claim 1, wherein each separate sequence is uploaded in parallel by a separate thread.

12. The method of claim 11, wherein at least one thread is comprised within a unique job process.

13. The method of claim 1, wherein the records are selected on a criterion of a date time stamp of update.

14. The method of claim 1, wherein the records are selected on a criterion of a record formation date time stamp.

15. The method of claim 1, wherein the records are selected on a criterion of a previous upload date time stamp.

16. The method of claim 1, wherein a selection of the plurality records is limited by a preset count.

17. The method of claim 3, wherein a count of records assigned to any loader is limited by a thread count assignment maximum.

18. The computer of claim 1, wherein when executed by the processor, the plurality of executable instructions further facilitates performance of operations further comprising selecting a plurality of record for upload from an ordered list of key values.

19. The computer of claim 18, wherein when executed by the processor, the plurality of executable instructions further facilitates performance of operations further comprising filtering the plurality of records prior to upload by a record parameter criteria.

20. The computer of claim 18, wherein when executed by the processor, the plurality of executable instructions further facilitates performance of operations further comprising selecting a first record of the plurality of records for upload based on value sequence of the ordered list of key values.

21. The computer of claim 18, wherein when executed by the processor, the plurality of executable instructions further facilitates performance of operations further comprising selecting a first record of the plurality of records a maximum value of the ordered list of key values.

22. The computer of claim 18, wherein when executed by the processor, the plurality of executable instructions further facilitates performance of operations further comprising selecting a first record of the plurality of records a minimum value of the ordered list of key values.

23. The computer of claim 18, wherein when executed by the processor, the plurality of executable instructions further facilitates performance of operations further comprising selecting a first record of the plurality of records on a basis of a criteria of the ordered list of key values.

24. The computer of claim 1, wherein when executed by the processor, the plurality of executable instructions further facilitates performance of operations further comprising assigning all record keys of a first key range of the plurality key ranges to an individual thread, and proceeding on to a second key range of the plurality of key ranges, whereby parallel uploading is performed and an incidence of data block contention is reduced.

* * * * *